United States Patent

Schwalb et al.

[11] Patent Number: 6,057,008
[45] Date of Patent: May 2, 2000

[54] PROCESS FOR BROADENING CHOLESTERIC REFLECTION BANDS OF PHOTOPOLYMERIZABLE CHOLESTERIC LIQUID CRYSTALS, AND OPTICAL ELEMENTS PRODUCED BY THIS PROCESS

[75] Inventors: Georg Schwalb, München; Mechthild Kopf, Forstern; Franz-Heinrich Kreuzer, Martinsried, all of Germany

[73] Assignee: Consortium fur elekrochemische Industrie GmbH, München, Germany

[21] Appl. No.: 09/096,236

[22] Filed: Jun. 11, 1998

[30] Foreign Application Priority Data

Jun. 19, 1997 [DE] Germany .......................... 197 26 051

[51] Int. Cl.$^7$ .................. C09K 19/38; G02F 1/1335; G02B 5/20; G02B 5/30; F21V 9/04
[52] U.S. Cl. ................ 428/1.1; 252/299.7; 252/582; 252/585; 252/589; 349/115; 349/176; 349/194; 359/500
[58] Field of Search .................. 252/299.7, 582, 252/585, 589; 349/176, 185, 115, 194; 359/500; 428/1.1

[56] References Cited

U.S. PATENT DOCUMENTS

| | | |
|---|---|---|
| 5,211,877 | 5/1993 | Andrejewski et al. ............ 252/299.01 |
| 5,301,045 | 4/1994 | Miller et al. ...................... 359/37 |
| 5,362,315 | 11/1994 | Müller-Rees et al. ............ 106/493 |
| 5,605,649 | 2/1997 | Stohrer et al. ................... 252/299.01 |
| 5,683,622 | 11/1997 | Uratzschmar et al. .......... 252/299.01 |
| 5,691,789 | 11/1997 | Li et al. ........................... 349/98 |
| 5,695,680 | 12/1997 | Weitzel et al. .................. 252/299.01 |
| 5,948,831 | 9/1999 | Broer et al. ..................... 522/182 |

FOREIGN PATENT DOCUMENTS

| | | |
|---|---|---|
| 0533215 | 3/1993 | European Pat. Off. . |
| 0606940 | 7/1994 | European Pat. Off. . |
| 0601483 | 9/1995 | European Pat. Off. . |
| 0685749 | 12/1995 | European Pat. Off. . |
| 0661287 | 5/1996 | European Pat. Off. . |
| 0819971 | 1/1998 | European Pat. Off. . |
| 4234845 | 4/1994 | Germany . |
| 4240743 | 6/1994 | Germany . |

OTHER PUBLICATIONS

R. Maurer et al., "Polarizing Color Filters made from Cholesteric LC Silicones", SID 90 Digest, 1990, pp. 110–113.
S.V. Belayev, M. Schadt, M.I. Barnik, J. Fünfschilling, N.V. Malimoneko and K. Schmitt, Jpn. J. Appl. Phys. 29, L273 (1990).
R. Maurer et al., "Cholesteric Reflectors with a Color Pattern", SID 94 Digest, 1994, pp. 399–402.
S. Mazkedian, S. Melone, F. Rustichelli, J. Physique 37, 731 (1976).
L. E. Hajdo, A.C. Eringen, J. Opt. Soc. Am. 36, 1017 (1976).
Li et al., "A Single–Layer Super Broadband Reflective Polarizer", SID 96 Digest, 1996, pp. 111–113.
J. Lub, D.J. Broer, A. M. Hikmet and K.G. Nierop, Liq. Cryst. 18, 319 (1995).

*Primary Examiner*—Shean C. Wu
*Attorney, Agent, or Firm*—Brooks & Kushman P.C.

[57] ABSTRACT

Process for broadening cholesteric reflection bands of photopolymerizable cholesteric liquid crystals, and optical elements produced by this process. The invention relates to a process for broadening the cholesteric reflection bands of photopolymerizable cholesteric liquid crystals, which comprises the following process steps:

1) partial polymerization of a layer containing photopolymerizable cholesteric liquid crystals by exposure to actinic light for a defined brief period at a defined temperature,
2) observance of a defined waiting time without exposure (dark phase) at a defined temperature,
3) fixing of the resultant layer by exposure to actinic light at a defined temperature.

26 Claims, 5 Drawing Sheets

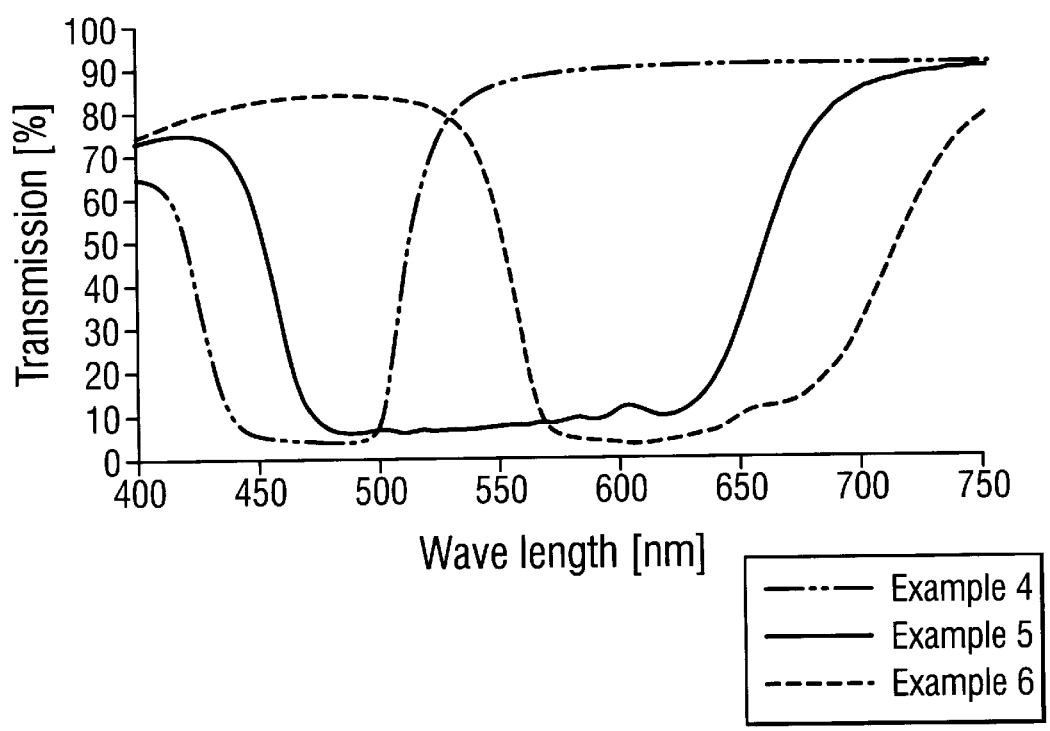

PROCESS FOR BROADENING CHOLESTERIC REFLECTION BANDS OF PHOTOPOLYMERIZABLE CHOLESTERIC LIQUID CRYSTALS, AND OPTICAL ELEMENTS PRODUCED BY THIS PROCESS

TECHNICAL FIELD

The invention relates to a process of broadening the reflection bands of photopolymerizable cholesteric liquid crystals, and to optical elements, such as colored filters, reflectors, polarizers and pigments, produced by this process.

BACKGROUND OF THE INVENTION

Liquid-crystalline materials having cholesteric properties, herein abbreviated as "cholesteric liquid crystals", are substances having a helical arrangement of the molecules. These materials are usually prepared as a thin layer between two suitable substrates in such a way that the helix axis is perpendicular to the substrate surfaces. The pitch of the helix is material-dependent and is constant over the layer thickness. Such optically anisotropic layers are able to reflect a circular light component fully if the direction of rotation and light wavelength $\lambda$ in the material correspond to the direction of rotation and pitch p of the cholesteric helix (cholesteric reflection). By contrast, the second circular light component having the opposite direction of rotation is transmitted fully.

The cholesteric reflection occurs in a spectral band between the wavelengths $\lambda_1 = p^* n_o$ and $\lambda_2 = p^* n_e$, where $n_e$ and $n_o$ denote the extraordinary and ordinary refractive indices of the material. This reflection band can be characterized by two parameters, the central wavelength $\lambda_o$ and the width $\Delta\lambda$. The central wavelength $\lambda_o$ depends on the mean refractive index and pitch p of the material. The width $\Delta\lambda$ of the cholesteric reflection band is dependent on the birefringence $\Delta n = n_e - n_o$ of the material in accordance with the equation $\Delta\lambda = p^*(n_e - n_o)$. In practice, the birefringence of most cholesteric materials in the visible spectral region is restricted to values lower than 0.3. Consequently, the maximum possible band width is about 100 nm. Usually, however, only 30–50 nm is achieved. Outside the reflection band and in the absence of absorption, light having both polarization directions (right-handed circular and left-handed circular, i.e. unpolarized) is transmitted fully. The reflected or transmitted circular-polarized light can, if desired, be converted into linear-polarized light by means of an additional quarter-wave retardation layer.

An essential prerequisite for the use of cholesteric materials is adequate thermal and mechanical stability of the layers. This stability can be achieved by fixing the alignment state by polymerization or by rapid cooling to temperatures below the glass transition temperature. Stable cholesteric layers of this type are described, for example, by R. Maurer et al. under the title "Polarizing Color Filters made from Cholesteric LC Silicones" in SID 90 DIGEST, 1990, pp. 110–113.

Owing to the aforementioned optical and mechanical properties, cholesteric materials are suitable both as polarizing and color-selective reflectors and as polarizing and color-selective optical filters. They have the great advantage over filters made from absorbent materials in that heating of the filter material is substantially avoided. Given a corresponding band width of the cholesteric reflection, these materials can also be used as so-called reflective polarizers, for example in liquid-crystal displays:

If unpolarized light from a light source located between a cholesteric layer and a mirror (metal) hits the cholesteric layer, circular-polarized light having a direction of rotation opposite to that of the layer helix passes through the layer, while the remaining fraction having the same direction of rotation is reflected. This component hits the mirror and experiences inversion of the direction of rotation of the circular polarization, with the consequence that this light component can then likewise pass through the cholesteric layer. In theory, therefore, complete conversion of unpolarized light into circular-polarized light takes place. Compared with conventional arrangements consisting of light source, mirror and absorptive polarizer, it is possible to double the light yield of the illumination unit of a liquid-crystal display. At the same time, the absence of absorption means that heating and bleaching of the polarizer is avoided (S. V. Belayev, M. Schadt, M. I. Barnik, J. Funfschilling, N. V. Malimoneko and K. Schmitt, JPN. J. APPL. PHYS. 29, L273 (1990)).

Photopolymerizable cholesteric materials can also be photostructured. This is described, for example, by R. Maurer et al. "Cholesteric Reflectors with a Color Pattern" in SID 94 DIGEST, 1994, pp. 399–402. The material described therein exhibits pronounced thermochromicity, i.e. a strong dependence of the reflection color on temperature. The desired color can therefore be set by means of the temperature of the sample and fixed by exposure to UV through a mask. The color of the unexposed areas of the cholesteric layer can be modified by subsequent temperature change. This color is permanently fixed by a second exposure to UV, if desired again through a mask. This operation can be repeated at different temperatures with further masks to produce multicolored structured filters and reflectors. Such structured filters and reflectors can be used, for example, in color projectors and in liquid-crystal displays.

A further application of cholesteric materials is as pigments produced by grinding and screening cholesteric films. Suitable materials and their production are described, for example, in EP 0 601 483.

The actual achievement of these potential applications has hitherto been greatly restricted by the limited width of the reflection bands. For industrial use, it is in addition desirable for both the central wavelengths of the reflection band and the width of the reflection band to be freely and independently adjustable in accordance with the particular requirements. For the specific use as reflective broad-band polarizers, it is even necessary for the reflection band to cover the entire visible spectral region, i.e. for the cholesteric layer to have a band width of greater than 300 nm.

The problem of inadequate band width can in principle be solved by constructing the optical element from a plurality of layers having different central wavelengths. This is described in the above-mentioned article by R. Maurer et al. However, this method is very expensive and has the disadvantage that the optical quality of the optical element decreases with each additional layer owing to scattering at flaws and inhomogeneities.

Another process of solving the above-mentioned problem is to broaden the reflection band by means of a gradient in the helix pitch (pitch gradient). This approach has already been known for some time from theoretical studies (for example, S. Mazkedian, S. Melone, F. Rustichelli, J. PHYSIQUE 37, 731 (1976) and L. E. Hajdo, A. C. Erigen, J. OPT. SOC. AM. 36, 1017 (1979)).

The process described in EP 0 606 940 A2 uses a mixture of chiral and nematic monomers having different reactivity with respect to their polymerization properties, the mixture additionally containing a dye whose absorption properties are matched to the UV radiation used for the photopolymerization. During the photopolymerization, the dye absorbs part of the UV light, generating a strong intensity gradient within the cholesteric layer. Owing to the different reactivity of the nematic and chiral monomers, a diffusion process takes place, generating the desired pitch gradient. In EP 0 606 940 A2, this is a linear pitch gradient, where the smallest pitch occurs on the side facing the UV source. The process described is furthermore characterized by continuous UV exposure to low intensities for a long period.

A disadvantage of this process is that it always requires a mixture of various monomers having different reactivity with respect to polymerization and in addition a dye must be incorporated. This process thus requires complex and expensive material synthesis. A further disadvantage is that the ultra-violet exposure must be kept constant for a relatively long time, in the order of 10 minutes. In the continuous production process, in which the optical layer is applied continuously to or between films and photopolymerized, a long, homogeneously illuminated exposure zone is therefore necessary. The long residence time greatly restricts the achievable throughput of produced film. The admixture of the UV dye also results in some disadvantages. For example, the absorption of the dye, as described in one example of EP 0 606 940 A2, results in a undesired restriction of the band width in the short-wave spectral region. In addition, the warming associated with dye absorption can result in impairment or even destruction of the optically active layer.

A further process which likewise has the object of generating a pitch gradient has been published by Faris et al., "A Single-Layer Super Broadband Reflective Polarizer" in SID 96 DIGEST, 1996, pp. 111–113. This process is based on a mixture of a photocrosslinkable cholesteric polysiloxane with a non-crosslinkable low-molecular-weight nematic compound. Here too, slow photocrosslinking is carried out with low-intensity UV exposure, with phase separation between the crosslinkable polysiloxane and the non-crosslinkable nematic compound taking place during the UV polymerization. As a consequence of this phase separation, the segregated molecules can diffuse within the layer and generate a concentration gradient, which in turn results in a pitch gradient.

As in the previous process, this process also has the principal disadvantage that at least two different starting components must be synthesized. This process is likewise based on slow crosslinking being achieved by maintaining the UV exposure for an extended period, with the disadvantages already described above for a continuous production process.

SUMMARY OF THE INVENTION

The object of the present invention is to provide a process of broadening the cholesteric reflection bands of photopolymerizable cholesteric liquid crystals which enables the central wavelength and band width of the cholesteric reflection band of the polymerized material to be adjusted independently of one another and at the same time avoids the above-mentioned disadvantages, in particular the extended UV exposure.

The object is achieved by a process which comprises the following three steps:

1) partial polymerization of a layer containing photopolymerizable cholesteric liquid crystals by exposure to actinic light for a defined brief period at a defined temperature, 2) observance of a defined waiting time without exposure (dark phase) at a defined temperature, 3) fixing of the resultant layer by further exposure to actinic light at a defined temperature.

BRIEF DESCRIPTION OF THE DRAWINGS

FIG. 4 illustrates the transmission spectra of the compositions of Working Examples 4, 5 and 6 from Table 4.

DETAILED DESCRIPTION OF THE INVENTION

Figure 1:
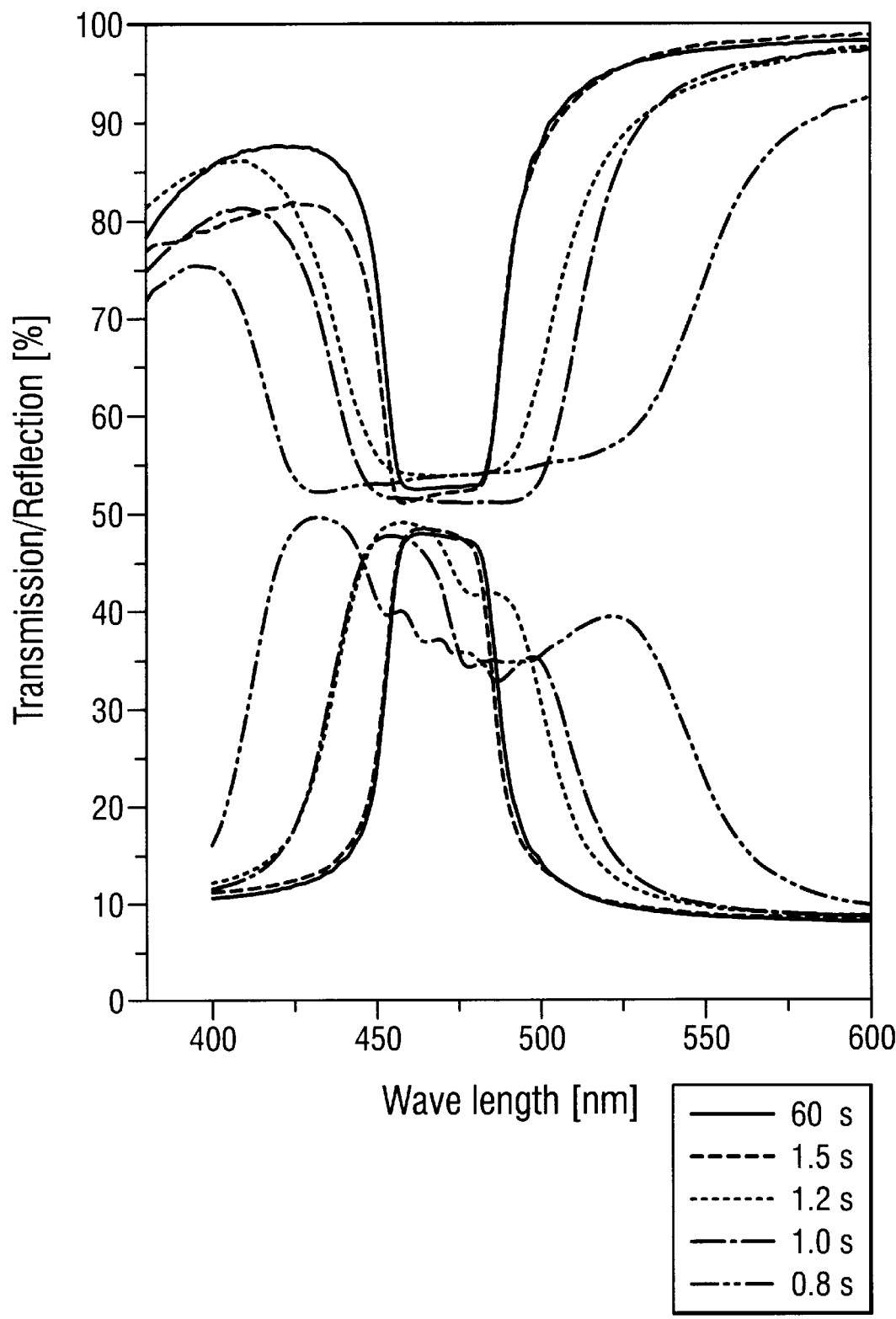
FIG. 1 illustrates transmission/reflection spectra of the compositions of Table 2.

In contrast to known processes, the process according to the invention makes it possible to start from only one liquid-crystalline substance having a cholesteric phase. However, it is also possible to use mixtures of liquid-crystalline substances having cholesteric phases or to admix further components in order to optimize other desired properties.

The novel process has the significant advantage over known processes that it is not necessary to carry out extended exposure.

Suitable starting materials for the novel process are photopolymerizable materials having cholesteric properties. Such materials are disclosed, for example, in J. Lub, D. J. Broer, A. M. Hikmet and K. G. Nierop, LIQ. CRYST. 18,319 (1995). For example, use can be made of cholesteric monomers, oligomers or polymers or mixtures of cholesteric monomers, oligomers or polymers with chiral monomers or mixtures of cholesteric monomers, oligomers or polymers with achiral monomers or mixtures of cholesteric oligomers with chiral and achiral monomers or mixtures of achiral monomers, oligomers or polymers having liquid-crystalline phases with chiral monomers.

Preference is given to cholesteric polysiloxane-based oligomers. Particular preference is given to cholesteric polysiloxane-based oligomers which contain cholesterol derivatives or isomeric cholesterol derivatives as chiral species. Such materials are disclosed, for example, in U.S. Pat. No. 5,211,877.

It is known that liquid crystals (LCs) consisting of organosiloxane skeletons carrying mesogenic side groups are distinguished from non-siloxane-containing LC systems by the possibility of varying the molecular weight simply and to a virtually unlimited degree through the choice of the organo-siloxane backbone. This enables the liquid-crystalline properties, such as, for example, phase behavior, glass transition temperature and clearing point, or, for example, also the viscosity, to be matched to requirements in broad ranges.

The novel process can be used for materials from the material class described above which have left- or right-handed rotation. The photopolymerization of the substances is facilitated by addition of a photo-initiator.

In the novel process, the photopolymerizable material is preferably used in the form of a layer, for example in the form of a film. The film is prepared by methods known from the literature. The photopolymerizable material is prepared, for example, as a thin homogeneous layer on a substrate or between two substrates and, if desired, is aligned by further measures known per se, which are described below by way of example.

The substrates used can be solid or flexible carriers or combinations thereof. The smooth surface and transparency of glass plates or films makes them particularly suitable.

Preference is given to optically isotropic substrates, since they do not change the state of polarization of the light. For filters and reflectors which are intended to generate linear polarization instead of circular, a particularly suitable carrier is an optically uniaxial, birefringent substrate which has an optical retardation of 0.25 times the wavelength in the wavelength range used. Such a quarter-wave retardation layer, abbreviated as "λ/4 retardation layer", is produced, for example, by defined stretching of a polycarbonate, polyethylene terephthalate or polypropylene film. Alternatively, the substrate used can also be a laminate of two different birefringent films whose directions of stretching are essentially aligned perpendicular to one another. Owing to the different dispersions of the two films, the overall retardation of the laminate changes with the wavelength. The film material and the degree of stretching should be selected so that an overall retardation of 0.25 times the wavelength occurs if possible over the entire wavelength range used by the filter or reflector.

It is of course also possible subsequently to combine a λ/4 retardation layer with the novel cholesteric layer.

It is advantageous to use alignment layers on the substrate side facing the cholesteric layer, for example in the form of rubbed polyimide or rubbed polyvinyl alcohol layers. These alignment layers favor good alignment of the cholesteric helix axis perpendicular to the substrate surface. When films are used, unidirectional rubbing of the film surface can also ensure good alignment.

The material can be applied either from a melt or from solution with subsequent evaporation of the solvent by methods known per se, for example with the aid of a knife coater or roller or by spin coating.

The layer thickness applied is preferably 3–60 μm, particularly preferably from 5 to 40 μm, and can be set, for example, by means of a spacer or by an application method having a defined layer thickness.

The macroscopic alignment of the layer is carried out at a temperature at which the material has a cholesteric phase and is achieved by methods known per se, such as, for example, shearing of the material or application of electric or magnetic fields. The application and alignment of the liquid-crystalline substances can be carried out fully continuously, semi-continuously or discontinuously. An aligned, but as yet unpolarized layer produced in this way has constant pitch over the layer thickness.

In the first process step necessary in accordance with the invention, the aligned cholesteric film is exposed to actinic light. Actinic light is defined herein as photochemically active light, for example UV light, X-rays, gamma radiation or irradiation with high-energy particles, such as electrons or ions. Preference is given to irradiation with UV light.

The irradiation is carried out in such a way that only some of all possible polymerizable molecules are polymerized after exposure. The proportion of polymerized molecules after exposure should preferably be between 0.1% and 69%, particularly preferably between 1 and 50%, of the polymerizable molecules.

If this proportion is lower than stated, the resultant polymer structure is not sufficiently stable for the subsequent process steps. This is evident, for example, from a large temperature change resulting in a shift in the central wavelength and not in a broadening of the reflection band. If, by contrast, the first exposure results in too many groups being polymerized, the cholesteric pitch has been fixed so strongly that the formation of a pitch gradient is suppressed. This is the case in conventional exposure, which is taken to mean exposure which results in more than 70% of the polymerizable molecules being polymerized.

This proportion of polymerized molecules is determined, for example, by trial exposures with subsequent extraction or by calorimetric determination of the time/conversion curve.

The proportion of polymerized molecules is controlled by the incident exposure energy per unit area. Preference is given to intense exposure of the shortest possible duration. The requisite exposure energy depends on the type of irradiation used, on the material used, on the photoinitiator and on the layer thickness.

Preferred exposure energies per unit area during the first exposure are in the range from 1 to 500 mJ/cm$^2$ (UV-A region), particularly preferably in the range from 10 to 50 mJ/cm$^2$ (UV-A). By comparison, conventional exposure resulting in polymerization of >70% of the polymerizable molecules uses exposure energies of greater than 500 mJ/cm$^2$.

The temperature at which the first exposure is carried out can be selected within the cholesteric phase range of the material used. It is preferably in the range from 0° C. to 200° C.

This temperature also affects the central wavelength of the broadened reflection band. This temperature selection allows, for example in the case of the preferred materials, the central wavelength to be varied over the entire visible spectral region. The time period for the dark phase can be selected in the range from a few seconds to a number of days. The exposure in the first step (pre-exposure) is followed, as the second step, by a dark phase, i.e. a period without exposure.

The dark phase can proceed at the same temperature as the exposure in the first step Dr at another temperature than the exposure in the first step. Thus, it is also possible, for example, to change the temperature in the second process step by up to ±100° C. relative to the temperature in the first process step.

The temperature n the dark phase can be used to control the rate of broadening of the reflection band. A temperature increase results in faster broadening of the reflection band. The maximum possible temperature for the dark phase is restricted by the clearing point of the partially polymerized layer. The temperature selected is preferably between the temperature in the first process step and this clearing point.

The essential parameters for setting the desired band width of the reflection band of the material having cholesteric properties are the exposure energy of the exposure in the first process step and the duration and temperature of the dark phase in the second process step.

At the same temperature and duration of the dark phase, the width of the reflection band of the LC material increases with decreasing exposure energy in the first process step. On the other hand, a longer duration of the dark phase at the same exposure energy in the first process step results in increasing broadening of the reflection band of the LC material.

The choice of a minimal pre-exposure energy and a correspondingly long dark phase allow band widths of greater than 300 nm to be achieved by means of the novel process.

The dark phase is followed, as the third process step, by a second exposure to actinic light. This second exposure has the object of polymerizing, whenever possible, all as yet unpolymerized molecules. This results in fixing and stabilization of the cholesteric layer. Preference is again given to exposure to UV light. The known exposure energy of conventional exposure is sufficient.

This third process step can be carried out at the same temperature as the dark phase or at a different temperature to the dark phase. The temperature range described for the dark phase applies. The simplification of the process means that this third process step is preferably carried out at the same temperature as during the dark phase.

Compared with materials produced by conventional exposure, the materials produced by the novel process exhibit broadening of the cholesteric reflection band by at least 10 nm on both sides. These materials preferably exhibit a reflection band having a width of greater than 100 nm.

The invention thus also relates to photo-polymerized cholesteric liquid crystals produced by the novel process and having a cholesteric reflection band which is broadened by at least 10 nm compared with photopolymerized cholesteric liquid crystals prepared by conventional exposure.

The greatest pitch in the material according to the invention occurs on the material side facing the exposure lamp.

The novel process can also be used for reflection bands in the near-UV and in the infra-red spectral region. To this end, materials may be used whose central wavelength is in this spectral region.

For industrial implementation, it is desirable for the novel process to be suitable for a continuous production process on a coating machine. A continuous production process of this type preferably proceeds as follows: a carrier film coated with a polymerizable liquid crystal and laminated with a cover film is subjected, in a first process step at a defined temperature, to a first short exposure, which results, as already stated above, in partial polymerization of the polymerizable material. The short exposure time means that high material throughput can be achieved in this process step.

For reflection bands which are not very broad, this is immediately followed by the second process step (the dark phase) for a correspondingly short period and the third process step (the second exposure). It is advantageous for all process steps to be carried out in a single pass.

For very broad reflection bands, a longer duration of the second process step (the dark phase) may be necessary. This could be achieved by interim storage of the exposed film, if desired at a temperature which differs from the temperature of the first process step. Subsequently, in the third process step, the second exposure is carried out in a manner known per se, and the material is finally stabilized. This separate third process step can, if desired, be combined with further process steps, for example application of an adhesive layer. In spite of the interim storage, this procedure ensures high material throughput, since the machine passes can take place at high speed owing to the short exposure times.

The novel process is also suitable, for example, for the production of photostructured cholesteric filters and reflectors having broadened reflection bands. To this end, the process is carried out as described above, with the difference that at least the exposures of the material (process steps 1 and 3 according to the invention) take place through a mask. The first mask is then moved or replaced by a second mask, and process steps 1 to 3 according to the invention are repeated with a change in at least one parameter in steps 1 or 2, so that an as yet unexposed part of the material is irradiated.

The phrase "with a change in at least one parameter in steps 1 or 2" is taken to mean that, when repeating the process, a different reflection color is set for the material region now irradiated by means of a different temperature during the exposure in the first process step, or, through appropriate selection of temperature or duration of the dark phase in the second process step, the band width of the reflection band for the material region now irradiated is in each case set as desired.

If desired, the process is repeated as often as necessary with as yet unexposed regions of the material. In this way, a multicolored photostructured filter or reflector can be produced whose individual colors are freely adjustable through the respective choice of central wavelength and band width of the reflection band.

In detail, the following procedure, for example, can also be followed:

1. Photostructured materials having reflection bands of different band widths and the same central wavelength are obtained if the cholesteric material
   a) is exposed at the same temperature, but at different pre-exposure doses for the individual structures in the first process step in each case, and the other process steps are each carried out at the same temperature and for the same duration of the dark phase, or
   b) is exposed at the same temperature and the same pre-exposure dose for the individual structures in the first process step in each case, and the other process steps are carried out at different temperatures and/or different durations of the dark phase for the respective structure.
2. Photostructured materials having reflection bands of different band widths and different central wavelengths are obtained if the cholesteric material
   a) is exposed at different temperatures, with in each case, different pre-exposure doses for the individual structures in the first process step in each case, and the other process steps are each carried out at the same temperature and for the same duration of the dark phase, or
   b) is exposed at different temperatures with the same pre-exposure dose for the individual structures in the first process step in each case, and the other process steps are carried out at different temperatures and/or duration of the dark phases for the respective structure.
3. Photostructured materials having reflection bands of the same band width and different central wavelength are obtained if the cholesteric material is exposed at different temperatures with the same pre-exposure dose for the individual structures in the first process step in each case, and the other process steps are each carried out at the same temperature and for the same duration of the dark phase.

Depending on the system actually selected, optimization of the initial dose and of the duration and temperature of the dark phase may be necessary. In the claims, the temperatures identified by the terms "first defined temperature", "second defined temperature", etc., may be the same or different temperatures.

In order to accelerate and to simplify the production process, the same process steps for the various structures, instead of being carried out at separate locations and/or times, can, if desired, also be carried out at the same locations and/or times.

The control of the central wavelength and width of the reflection band which is possible by means of the novel process allows the desired photometric properties of optical elements, such as polarizers, colored filters, pigments or reflectors, in particular also of structured filters and reflectors for left-handed or right-handed circular-polarized light, to be adjusted in a simple manner.

The invention therefore also relates to optical elements, for example, filters, reflectors and polarizers, which include layers containing materials having cholesteric properties which have been produced by the novel process. The novel optical elements preferably have cholesteric reflection bands having a band width of greater than 100 nm.

A suitable optical element is the novel layer having a cholesteric reflection band together with the substrates in the form of a laminate or in the form of a layer free on one side or even as a free film after removal of the substrate(s). This layer or laminate can be covered by further individual cholesteric layers or by other layers, for example retardation films (for example a λ/4 retardation layer), absorptive polymerization films, colored films or an adhesive layer.

However, it is also possible to use the novel process to produce optical elements, such as filters, reflectors and polarizers, in which the carrier substrate for the photopolymerizable LC material is a λ/4 retardation layer. The term "λ/4 retardation layer" is taken to mean a layer which has the retardation value 0.25 times the particular wavelength, if possible over the entire wavelength range used by the optical element.

The novel layer can even be used as optical elements in comminuted form as flakes. EP 0 601 483 A1 describes how cholesteric pigments which reflect visible light can be produced by detaching a polymerized cholesteric film from the substrate and then comminuting the rough pieces obtained in this way.

The novel films can be used in an analogous manner to produce cholesteric flakes having a broadened reflection band. Owing to their broader reflection band, such cholesteric pigments exhibit greater light reflection and therefore achieve better brightness. In addition, specifically broadened reflection bands allow new shades and effects to be achieved. Also interesting are cholesteric pigments whose reflection band covers the entire visible spectral region. They can be produced in an analogous manner from a novel cholesteric broad-band film. Such highly reflective pigments of neutral color are suitable, for example, for achieving metallic effects.

By setting the long-wave reflection edge at a suitable value, these pigments of neutral color can also give a colored impression when observed at an angle differing from the perpendicular.

The pigments can subsequently be incorporated analogously to EP 0 685 749 A1 into a suitable binder system. Preference is given to binder systems which, after curing, appear colorless in visible light and have a similar mean refractive index to the cholesteric flakes. To this end, the cholesteric flakes are stirred into the still-liquid binder. The alignment of the flakes parallel to the surface is achieved as described, for example, in EP 0 685 749 A1 on application of a thin layer of the pigment/binder mixture to a substrate or on extrusion of the mixture. Depending on the particular requirements the film can be detached from the substrate after the binder has cured or combined with further layers.

This invention likewise relates to devices containing the layers produced by the novel process in the form of filters, reflectors or polarizers. Such devices are, for examples, projectors, projection displays and liquid-crystal displays.

For example, a broad-band polarizer produced by this process can be used as reflective polarizer in the illumination unit of a liquid-crystal display. This allows the light yield of the liquid-crystal display to be improved by up to 100%.

The following examples serve to illustrate the invention in greater detail:

Starting materials:

All substances listed below were admixed with 2% by weight of the photoinitator Irgacure 907 (Ciba-Geigy AG, Switzerland).

Substance 1 (TC blue)

Substance 1 was prepared as described in Example 1a) of EP 0 661 287 (corresponding to Example 1a) of U.S. Pat. No. 5,605,649).

Substance 2 (96.2% of TC blue+3.8% of ABIS)

Substance 2 was obtained by mixing 96.2% by weight of substance 1 with 3.8% by weight of the chiral component isosorbide bis(4-allyloxybenzoate). This chiral component was prepared as follows:

24 mmol of isosorbide and 48 mmol of an ω-propenyloxybenzoyl chloride are dissolved in 40 mmol of toluene, and the mixture is refluxed for 12 hours. The toluene is removed by vacuum distillation, and the crude product is recrystallized from ethanol or isopropanol.

Substance 3 (50% of TC blue+50% of TC red)

Substance 3 was obtained by mixing substance 1 and a further left-handed helical oligomer prepared as described in Example 1b) of U.S. Pat. No. 5,605,649, in the ratio 1:1.

Substance 4 (74.3% of CC blue+17.1% of Machol+8.6% of MAABH)

Substance 4 was obtained by mixing 74.3% by weight of the cholesteric oligomer obtained according to Example 1A of DE 42 40 743 (corresponding to Example 1A of U.S. Pat. No. 5,362,315) with 17.1% by weight of methacrylic acid cholesteryl ester and 8.6% by weight of 4-methacryloyloxyphenyl 4-allyloxybenzoate.

Substance 5 (77.7% of CC blue rh+19.4% of MAHBEP+ 2.9% of ABIM)

Substance 5 was obtained by mixing 19.4% by weight of 4'-ethylphenyl 4-methacryloyloxybenzoate with 2.9% by weight of isomannide bis(4-allyloxybenzoate) and 77.7% by weight of a right-handed helical cholesteric oligomer obtained as described in Example 2 of DE 4234845 (corresponding to Example 2 of U.S. Pat. No. 5,695,680): 2.78 g of doristeryl 4-(propen-2-oxy)benzoate (CAS No.: 159235-15-1), 0.88 g of 4'-(4"-methoxyphenylcarbonyloxy) phenyl 4-(propen-2-oxy)benzoate (prepared by a conventional preparation process) and 0.95 g of tetramethylcyclotetrasiloxane were dissolved in 20 ml of dry toluene, 46 μl of a solution of dicyclopentadienylplatinum dichloride (1% strength by weight in methylene chloride) were added, and the mixture was warmed at 100° C. for 1.5 hours. The solution was cooled to 50° C., 2.46 g of 4'-methacryloyloxyphenyl 4-(propen-2-oxy)benzoate (CAS No.: 159235-16-2), 500 ppm of Q1301 (alternatively 3,000 ppm of 2,6-di-tert-butyl-4-methylphenol) and a further 27 μl of the catalyst solution were added. This solution was stirred at 70–80° C. for 2 hours. When the reaction was complete, the product was stirred with 150 mg of sodium hydrogencarbonate and filtered, and the product was reprecipitated from ethanol.

The preparation of isomannide bis(4-allyloxybenzoate) was carried out as follows:

24 mmol of isomannide and 48 mmol of an ω-propenyloxybenzoyl chloride were dissolved in 40 mmol of toluene, and the solution was refluxed for 12 hours. The toluene was removed by vacuum distillation, and the crude product was recrystallized from ethanol or isopropanol.

WORKING EXAMPLES

The films were produced as follows, unless stated otherwise:

Two glass plates were provided with a polyimide alignment layer, which was rubbed unidirectionally with a velvet cloth. A small amount of the melted substance was applied to the alignment layer of one of the plates at the temperature indicated in each case and was covered by the second plate. The glass plates were subjected to shear over a small distance in order to achieve good macroscopic alignment. The light source used was a mercury arc lamp (model 68810, L.O.T.-Oriel GmbH) whose shutter can be controlled by means of a time switch. The exposure powers in the UV-A region were measured using a UV Power Puck (EIT Inc., USA). The resultant reflection and transmission spectra were determined using a Perkin Elmer Lambda 19 UV/VIS spectrometer. The measurements in the circular-polarized ray path were carried out using a combination of Fresnel rhombus and Glan-Thompson polarizer as an achromatic circular-polarizing analyzer.

Working Example 1

A) Starting substance 1 was introduced, as described above, by melt preparation at 90° C. between two polyimide-coated glass plates, subjected to shear and exposed at 33 mW/cm$^2$ (UV-A) at 90° C. for 0.8 second. The layer thickness of the material was 15 μm. After a waiting time of 30 minutes at 90° C. in the dark, the second exposure was carried out, likewise at 90° C., at a power of 33 mW/cm$^2$ (UV-A), this time for 60 seconds.

The band width of the transmission band at the plateau (i.e. at 90% of minimum transmission) is 68 nm.

B) Substance 2 was used to prepare a layer as described in Example 1A), which was exposed by the same process steps. A band width of 120 nm is obtained.

C) Substance 3 was used to prepare a layer as described in Example 1A), which was exposed by the same process steps. A band width of 107 nm is obtained.

D) Substance 4 was used to prepare a layer as described in Example 1A), which was exposed by the same process steps. A band width of 83 nm is obtained.

E) Substance 5 was used to prepare a layer as described in Example 1A). The same process steps were carried out as in Example A), with the only difference being that the exposures and the dark phase were carried out at 85° C. instead of at 90° C. A band width of 93 nm is obtained.

Comparative Example 1

A) Starting substance 1 was introduced, as described above, by melt preparation at 90° C. between two polyimide-coated glass plates and subjected to shear. The layer thickness was 15 μm. This layer was irradiated conventionally at 33 mW/cm$^2$ (UV-A) at 90° C. for 60 seconds, i.e. only a single exposure, but at high exposure energy. A band width of 34 nm is measured in transmission.

B) Substance 2 was used to prepare a layer as described in Comparative Example 1A), which was exposed by the same process step. A band width of 39 nm is obtained.

C) Substance 3 was used to prepare a layer as described in Comparative Example 1A), which was exposed by the same process step. A band width of 30 nm is obtained.

D) Substance 4 was used to prepare a layer as described in Comparative Example 1A), which was exposed by the same process step. A band width of 27 nm is obtained.

E) Substance 5 was used to prepare a layer as described in Comparative Example 1A), which was exposed by 33 mW/cm$^2$ (UV-A) at 85° C. for 60 seconds. A band width of 45 nm is obtained.

The central wavelengths and widths of the reflection bands from Working Examples 1A to 1E and the corresponding Comparative Examples 1A to 1E are compared in Table 1.

Even substance 1 consisting of only one component, a cholesteric oligomer, shows a broadening of the reflection band. The first four substances are left-handed helical mixtures, while substance 5 is a right-handed helical mixture. Here too, use of novel process results in a broadening of the reflection band.

TABLE 1

| | Substance | Central wavelength [nm] | Band width for conv. ex. [nm] | Broadened band [nm] |
|---|---|---|---|---|
| Comparative Example 1A | 1 | 386 | 34 | |
| Working Example 1A | 1 | 386 | | 68 |
| Comparative Example 1B | 2 | 504 | 39 | |
| Working Example 1B | 2 | 504 | | 120 |
| Comparative Example 1C | 3 | 490 | 30 | |
| Working Example 1C | 3 | 490 | | 107 |
| Comparative Example 1D | 4 | 443 | 27 | |
| Working Example 1D | 4 | 443 | | 83 |
| Comparative Example 1E | 5 | 445 | 45 | |
| Working Example 1E | 5 | 445 | | 93 |

Working Example 2

A) A small amount of substance 2 was prepared in the melt at 96° C. as described above between two polyimide-coated glass plates. The layer thickness was 12 μm. The first exposure at 96° C. lasted 1.5 seconds at an exposure power of 33 mW/cm$^2$ (UV-A region). After the exposure, the film was cooled to 70° C. within 5 minutes. After a waiting time of 20 minutes at 70° C., the second exposure was carried out, likewise at 33 mW/cm$^2$ (UV-A), this time for a period of 10 seconds. Measurement in the unpolarized ray path using the UV/VIS spectrometer gave the reflection and associated transmission bands shown in FIG. 1. The band width of the transmission band at the plateau (i.e. 90% of the minimum transmission) is 32 nm.

B) A layer was prepared as in Example 2A) and exposed by the same process steps as in Example 2A), with the only difference being that the time for the first exposure was 1.2 seconds. The associated reflection and transmission bands are likewise shown in FIG. 1. A band width of 48 nm is obtained.

C) A layer was prepared as in Example 2A) and exposed by the same process steps as in Example 2A), with the only difference being that the time for the first exposure was 1 second. The associated reflection and transmission bands are likewise shown in FIG. 1. A band width of 59 nm is obtained.

D) A layer was prepared as in Example 2A) and exposed by the same process steps as in Example 2A), with the only difference being that the time for the first exposure was 0.8 second. The associated reflection and transmission bands are likewise shown in FIG. 1. A band width of 108 nm is obtained.

Comparative Example 2

For comparison, substance 2 was used to prepare a layer having a thickness of 12 μm as described in Working Example 2. This layer was irradiated conventionally at 33 mW/cm² (UV-A) at 96° C. or 60 seconds, i.e. only a single exposure, but at high exposure energy, was carried out. The associated reflection and transmission bands are likewise shown for comparison in FIG. 1. The band width achieved is 29 mm.

The data from Working Example 2 and Comparative Example 2 are shown in Table 2: the exposure energy is obtained from the product of the exposure power (in the UV-A region) times the exposure time.

TABLE 2

|  | 1st exposure [s] | Exposure energy in 1st exposure [mJ/cm²] | Band width [nm] |
| --- | --- | --- | --- |
| Comparative Example 2 | 60 | 1.980 | 29 |
| Working Example 2A) | 1.5 | 49.5 | 32 |
| Working Example 2B) | 1.2 | 39.6 | 48 |
| Working Example 2C) | 1 | 33 | 59 |
| Working Example 2D) | 0.8 | 26.4 | 108 |

Working Example 3

A) The substance 2 was used to prepare a layer as described in Working Example 2. The layer thickness was 12 μm. The first exposure at 33 mW/cm² (UV-A) was carried out at 96° C. for an exposure time of 0.8 second. After a waiting time of 1 minute at 96° C., the second exposure was carried out (96° C., 33 mW/cm² for 10 seconds). A band width of 36 nm is obtained.

B) A layer was prepared as in Example 3A) and exposed by the same process steps as in Example 3A), with the only difference being that the waiting time was 4 minutes at 96° C. A band width of 60 nm is obtained.

C) A layer was prepared as in Example 3A) and exposed by the same process steps as in Example 3A), with the only difference being that the waiting time was 7 minutes at 96° C. A band width of 86 nm is obtained.

D) A further layer was prepared as in Example 3A) and exposed by the same process steps as in Example 3A), with the only difference being that the waiting time was 15 minutes at 96° C. A band width of 115 nm is obtained.

Figure 2:
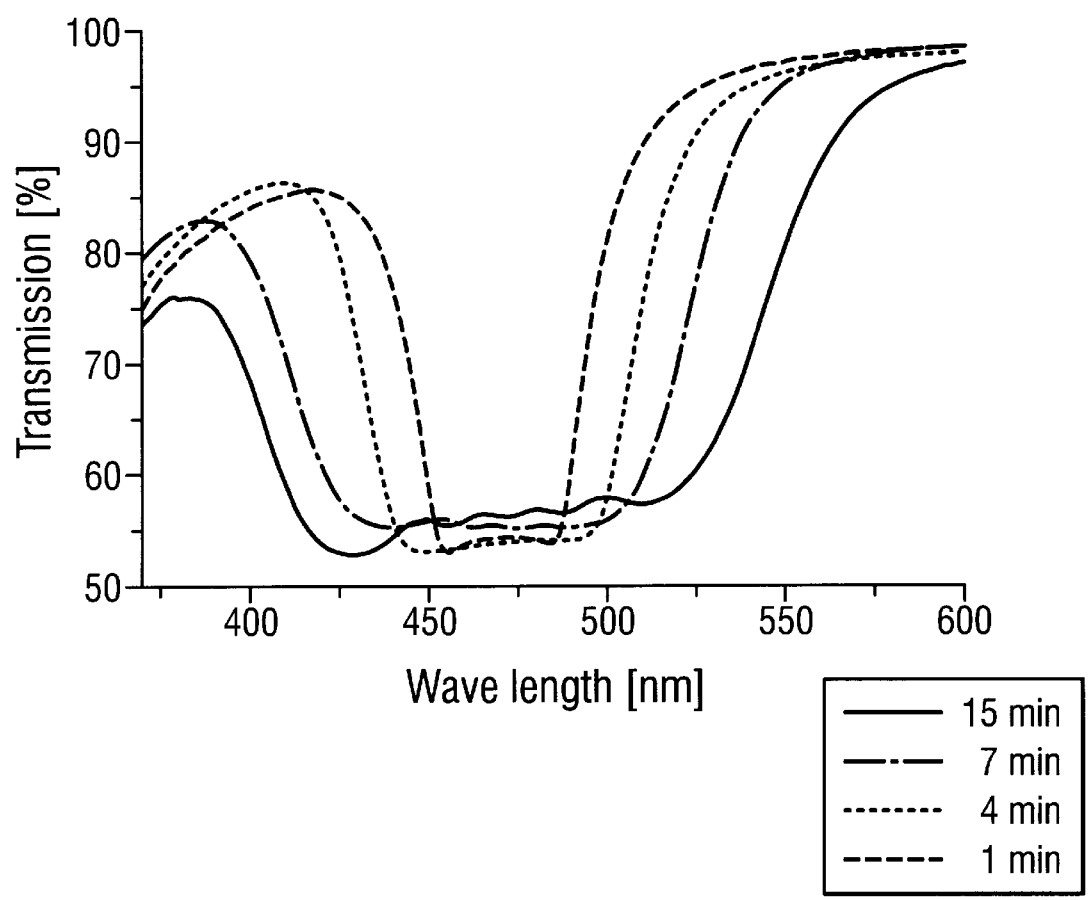
FIG. 2 illustrates transmission spectra of the compositions of Table 3.

The data and the resultant transmission bands in the unpolarized ray path for Working Examples 3A) to 3D) are shown in Table 3 and FIG. 2. As the waiting time increases, so does the broadening of the reflection band.

TABLE 3

|  | 1st exposure [s] | Dark phase [min] | Band width [mm] |
| --- | --- | --- | --- |
| Working Example 3A) | 0.8 | 1 | 36 |
| Working Example 3B) | 0.8 | 4 | 60 |
| Working Example 3C) | 0.8 | 7 | 86 |
| Working Example 3D) | 0.8 | 15 | 115 |

The following three working examples show how the novel process can be used to adjust the central wavelength and the band width independently of one another using the same material.

Working Example 4

A layer of substance 2 is prepared as described in Working Example 2 and exposed at 96° C. for 0.8 second, then conditioned at 96° C. for 4 minutes and finally exposed at 33 mW/cm² at 96° C. for 10 seconds. The central wavelength of the reflection band of the material treated in this way is at 468 nm. The band width of the reflection band of the material treated in this way is 60 nm and is 25 nm broader than a sample of the same material prepared conventionally at 96° C.

Working Example 5

A layer of substance 2 was prepared as described in Working Example 2A and, after shearing at 96° C., was cooled to 70° C. The first exposure at 33 mW/cm² was carried out at this temperature for a period of 0.6 second. The sample was then heated to 100° C. at 5° C/min and conditioned at this temperature for 20 minutes. The second exposure was also carried out at 100° C. (10 seconds at 33 mW/cm²).

Figure 3A:
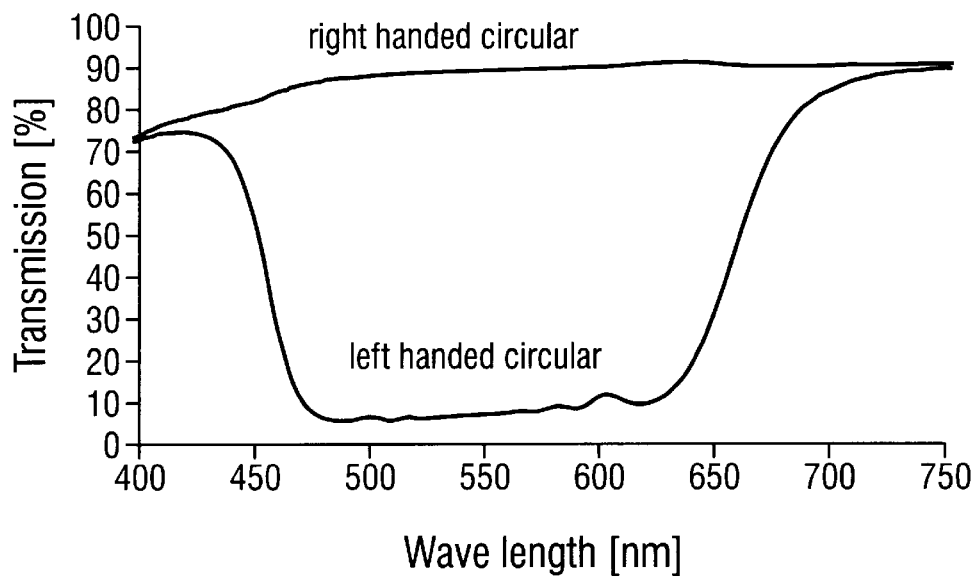
FIGS. 3a and 3b illustrate the transmission and reflection spectra of the composition of Working Example 5.
Figure 3B:
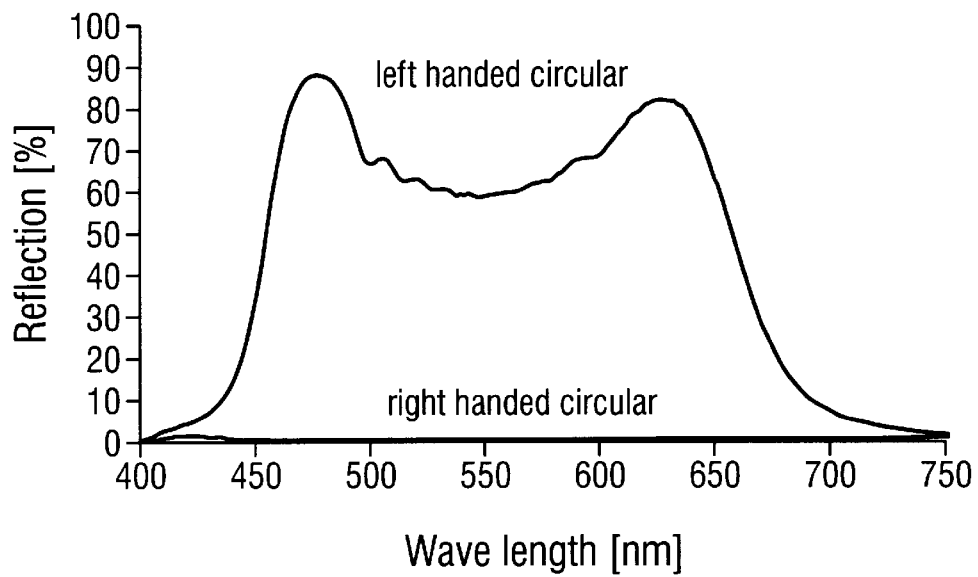

A central wavelength of 550 nm is obtained for the reflection band of the material treated in this way, and the band width of the reflection band is about 160 nm. The optical properties of the layers produced by the novel process are shown in FIG. 3. This figure shows the transmission and reflection in the left-handed and right-handed circular-polarized ray path. The ratio between right-handed and left-handed circular-polarized transmission is greater than 10:1. The ratio of left-handed to right-handed circular-polarized reflection is better than 100:1.

Working Example 6

A layer of substance 2 was prepared as described in Working Example 2A and, after shearing at 96° C., was cooled at 45° C. The first exposure (33 mW/cm², for 3 seconds) was carried out after a conditioning time of 15 minutes at 45° C. The sample was then heated to 100° C. at about 5° C./min. This was followed by a waiting time of 5 minutes, before the sample was exposed for the second time (33 mW/cm², for 60 seconds). Owing to the low initial temperature in the first exposure, the central wavelength is at 630 nm. The band width is about 115 nm.

The data for Working Examples 4, 5 and 6 are shown in Table 4: the associated transmission spectra in the left-handed circular-polarized ray path are shown in FIG. 4.

TABLE 4

| | 1st exposure | dark phase | 2nd exposure | central wavelength | band width |
|---|---|---|---|---|---|
| Working Example 4 | 0.8 s 96° C. | 4 min 96° C. | 10 s 96° C. | 468 nm | 60 nm |
| Working Example 5 | 0.6 s 70° C. | 20 min 100° C. | 10 s 70° C. | 550 nm | 160 nm |
| Working Example 6 | 3 s 45° C. | 5 min 100° C. | 60 s 100° C. | 630 nm | 115 nm |

The following two working examples show how reflection bands which cover the entire visible spectral region can be produced with the aid of the novel process:

Working Example 7

A layer of substance 2 was prepared at 96° C. as described in Example 2A and then cooled to 85° C. The layer thickness was 30 μm. The first exposure was carried out at 33 mW/cm² (UV-A) for 0.8 second at 85° C. The cholesteric layer was then heated to 100° C. After a waiting time of 120 minutes at 100° C., the second exposure was carried out at 33 mW/cm² (UV-A) at 100° C. for a period of 60 seconds.

Figure 5A:
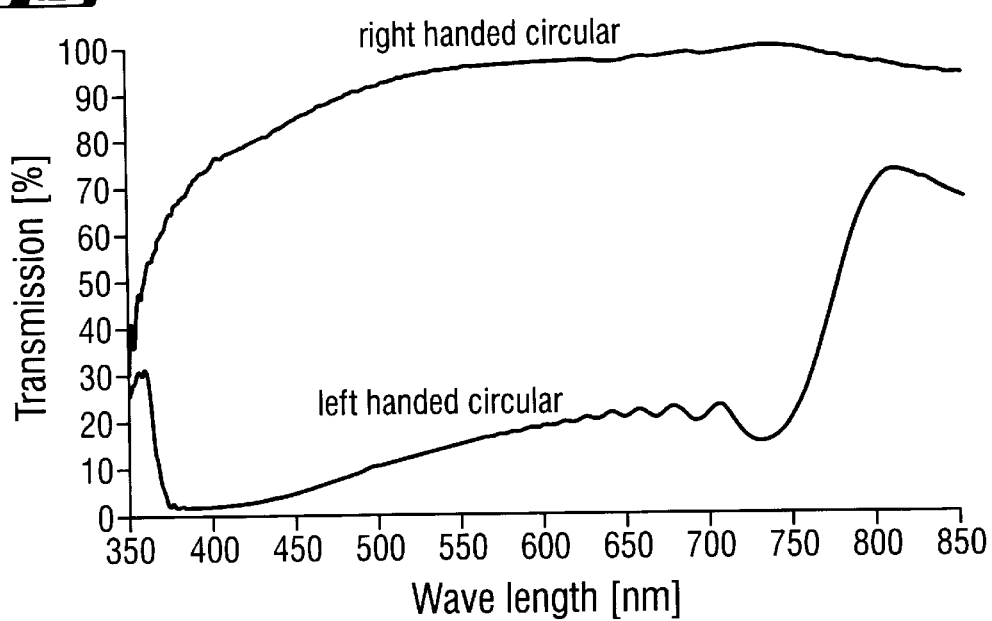
FIGS. 5a and 5b illustrate the transmission and reflection spectra of the composition of Working Example 7.
Figure 5B:
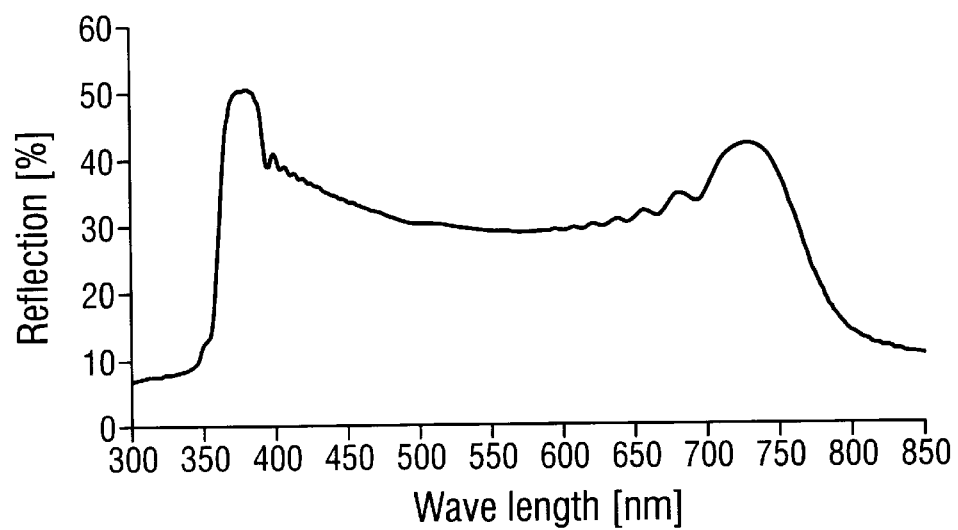

The resultant reflection and transmission bands are shown in FIG. 5. The reflection band extends from 370 nm to 750 nm.

Working Example 8

Substance 3 was used to prepare a layer at 95° C. as described in Example 2A. The layer thickness was 20 μm. After the sample had been cooled to 85° C., the cholesteric layer was exposed at 33 mW/cm² (UV-A) for 0.8 second, heated to 95° C. and then conditioned at this temperature for 120 minutes. The second exposure was carried out at 33 mW/cm² (UV-A) at 95° C. for a period of 60 seconds.

The resultant reflection band extends from 360 to 700 nm.

Working Example 9

A novel film was prepared between glass plates as described in Working Example 1D). The central wavelength was at 443 nm, and the width of the reflection band was 83 nm. The glass plates were subsequently separated. The cholesteric film was scraped off the glass substrate using a knife blade. The particles remaining were ground to a mean particle diameter of about 100 μm and mixed with a varnish in the ratio 1:10 parts by weight. The clear varnish used was a two-component polyurethane-based topcoat (Standoxo, Herberts). The varnish mixture was knife-coated onto black board in a wet-film thickness of 120 μm with the aid of a film applicator and was dried at 80° for one hour. The resultant board showed a bright blue-green coloration which shifted to blue with increasing viewing angle.

What is claimed is:

1. A process for broadening the cholesteric reflection bands of photopolymerizable cholesteric liquid crystals, which comprises the steps of:

1) polymerizing from 0.1% to 69% of the photopolymerizable cholesteric liquid crystals in a layer containing photopolymerizable cholesteric liquid crystals, by exposure to actinic light at a first defined temperature, 2) observing a defined waiting time without exposure (dark phase) at a second defined temperature, 3) fixing of the resultant layer by further exposure to actinic light at a third defined temperature.

2. A process as claimed in claim 1, wherein the photopolymerizable material having cholesteric properties is selected from the group consisting of cholesteric monomers, oligomers or polymers; mixtures of cholesteric monomers, oligomers or polymers with chiral monomers; mixtures of cholesteric monomers, oligomers or polymers with achiral monomers; mixtures of cholesteric oligomers with chiral and achiral monomers; and mixtures of achiral monomers, oligomers or polymers having liquid-crystalline phases with chiral monomers.

3. A process as claimed in claim 2, wherein the cholesteric oligomer used is a liquid-crystalline siloxane.

4. A process as claimed in claim 1, wherein a temperature change in the range from −100° C. to +100° C. has taken place between the first process step and the second process step.

5. A process as claimed in claim 2, wherein a temperature change in the range from −100° C. to +100° C. has taken place between the first process step and the second process step.

6. A process as claimed in claim 3, wherein a temperature change in the range from −100° C. to +100° C. has taken place between the first process step and the second process step.

7. A process for the production of photostructured cholesteric filters and reflectors having broadened reflection bands from cholesteric liquid-crystalline materials, comprising carrying out a first set of exposures of the liquid-crystalline material by means of the process steps of claim 1 through a mask; and then moving the mask or replacing the mask with a second mask and carrying out a further set of exposures by repeating the process steps of claim 1 with a change in at least one parameter in at least one of process steps 1 or 2 with respect to said first exposure and said second exposure, such that an as yet unexposed part of the material is irradiated in said further set of exposures.

8. A photopolymerized cholesteric liquid crystal prepared by a process as claimed claim 1, having a cholesteric reflection band which is broadened by at least 10 nm compared with a photopolymerized cholesteric liquid crystal prepared by conventional exposure.

9. A photopolymerized cholesteric liquid crystal prepared by a process as claimed claim 2, having a cholesteric reflection band which is broadened by at least 10 nm compared with a photopolymerized cholesteric liquid crystal prepared by conventional exposure.

10. A photopolymerized cholesteric liquid crystal prepared by a process as claimed claim 3, having a cholesteric reflection band which is broadened by at least 10 nm compared with a photopolymerized cholesteric liquid crystal prepared by conventional exposure.

11. A photopolymerized cholesteric liquid crystal prepared by a process as claimed claim 4, having a cholesteric reflection band which is broadened by at least 10 nm compared with a photopolymerized cholesteric liquid crystal prepared by conventional exposure.

12. A photopolymerized cholesteric liquid crystal prepared by a process as claimed claim 5, having a cholesteric reflection band which is broadened by at least 10 nm compared with a photopolymerized cholesteric liquid crystal prepared by conventional exposure.

13. A photopolymerized cholesteric liquid crystal prepared by a process as claimed claim 6, having a cholesteric reflection band which is broadened by at least 10 nm compared with a photopolymerized cholesteric liquid crystal prepared by conventional exposure.

14. A photopolymerized cholesteric liquid crystal prepared by a process as claimed claim 7, having a cholesteric reflection band which is broadened by at least 10 nm compared with a photopolymerized cholesteric liquid crystal prepared by conventional exposure.

15. An optical element having a broadened cholesteric reflection band, which comprises at least one layer containing material having a broadened cholesteric reflection band prepared by a process as claimed in claim 1.

16. An optical element having a broadened cholesteric reflection band, which comprises at least one layer containing material having a broadened cholesteric reflection band prepared by a process as claimed in claim 3.

17. An optical element having a broadened cholesteric reflection band, which comprises at least one layer containing material having a broadened cholesteric reflection band prepared by a process as claimed in claim 4.

18. An optical element having a broadened cholesteric reflection band, which comprises at least one layer containing material having a broadened cholesteric reflection band prepared by a process as claimed in claim 7.

19. An optical element having a broadened cholesteric reflection band, which comprises at least one layer containing material having a broadened cholesteric reflection band prepared by a process as claimed in claim 8.

20. An optical element as claimed in claim 15, wherein the reflection band has a band width of greater than 100 nm.

21. An optical element as claimed in claim 15, which additionally includes a $\lambda/4$ retardation layer.

22. An optical element as claimed in claim 20, which additionally includes a $\lambda/4$ retardation layer.

23. A device containing at least one optical element as claimed in claim 15.

24. A device containing at least one optical element as claimed in claim 20.

25. A device containing at least one optical element as claimed in claim 21.

26. A process for broadening the cholesteric reflection bands of photopolymerizable cholesteric liquid crystals disposed on a substrate, the process comprising:

a) polymerizing photopolymerizable cholesteric liquid crystal molecules at a first selected temperature by exposure to actinic light for a period sufficient to produce a partially polymerized film which is stable with respect to change of a central wavelength of reflection during subsequent processing steps but insufficient to prevent formation of a broadened cholesteric reflection band upon further processing by steps b) and/or c);

b) observing a waiting time without exposure at a second selected temperature; and c) further polymerizing said photopolymerizable cholesteric liquid crystal molecules by exposure to light at a third selected temperature, to form a product having disposed thereon cholesteric liquid crystals exhibiting a broadened cholesteric reflection band, wherein said first selected temperature, said second selected temperature, and said third selected temperature may be the same temperature or two or more different temperatures, and wherein the broadening of said broadened cholesteric reflection band is assessed by comparing the cholesteric reflection band of said product obtained in step c) to an otherwise similar product produced by full polymerization of photopolymerizable cholesteric liquid crystals in one step.

* * * * *